Dec. 14, 1971     E. W. ROBERTSON     3,626,598
MICROMETER FOR DETERMINING SIZE OF CURING RIM
Filed March 23, 1970     4 Sheets-Sheet 1
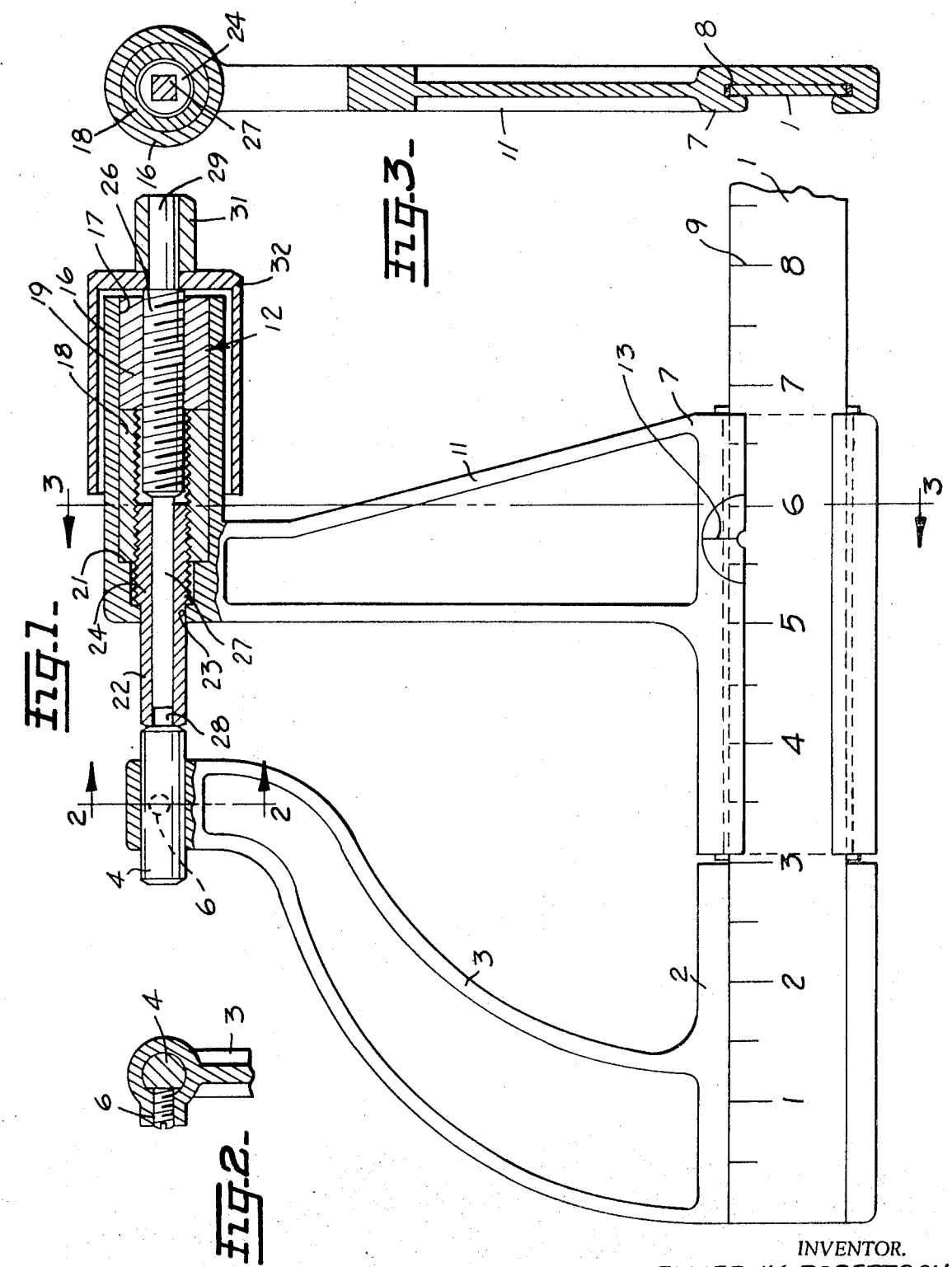
INVENTOR.
ELMER W. ROBERTSON
BY
George B White
ATTORNEY INVENTOR.
ELMER W. ROBERTSON
BY George B White
ATTORNEY Dec. 14, 1971   E. W. ROBERTSON   3,626,598
MICROMETER FOR DETERMINING SIZE OF CURING RIM
Filed March 23, 1970   4 Sheets-Sheet 3
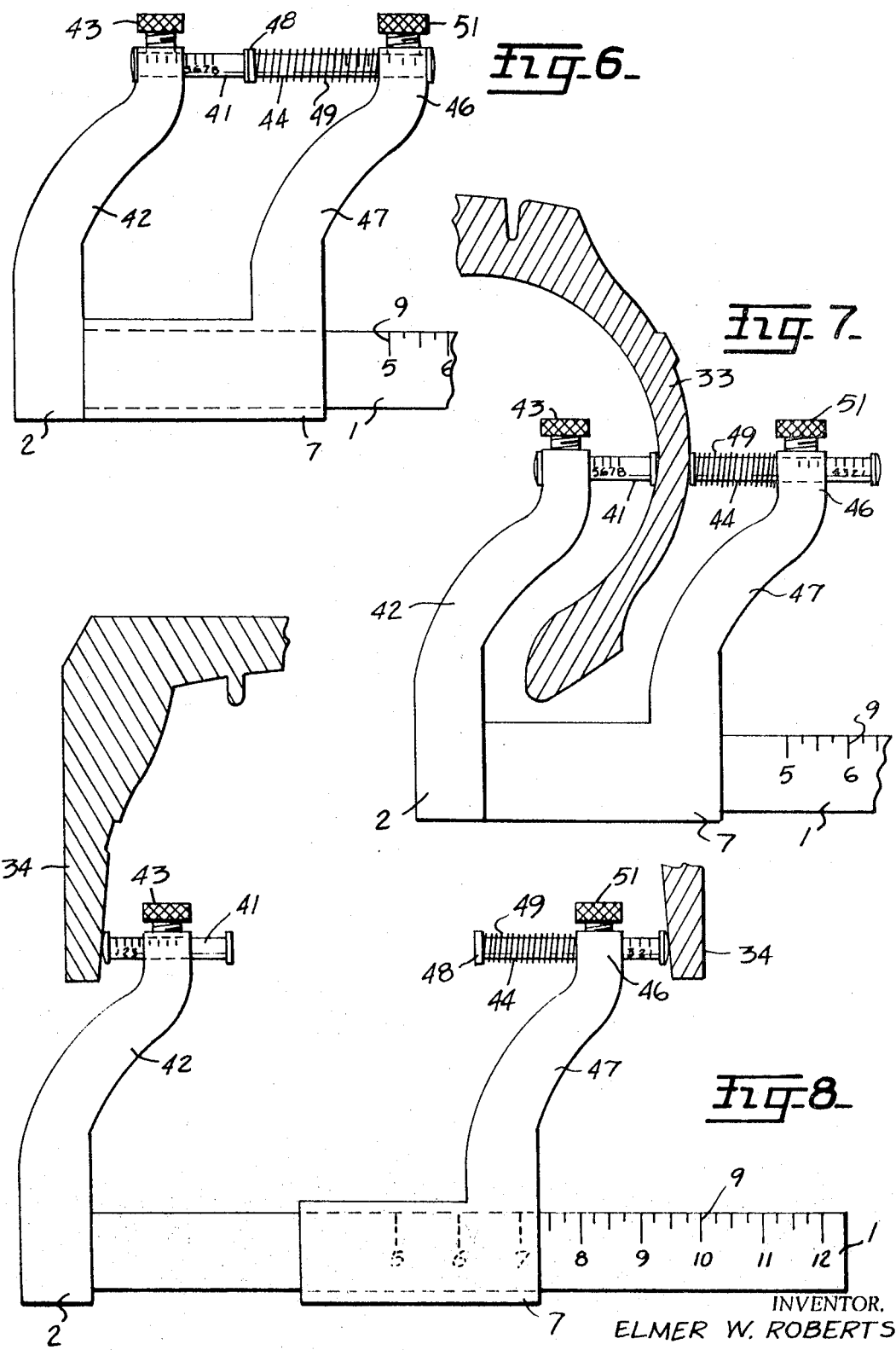
INVENTOR.
ELMER W. ROBERTSON
BY George B White
ATTORNEY

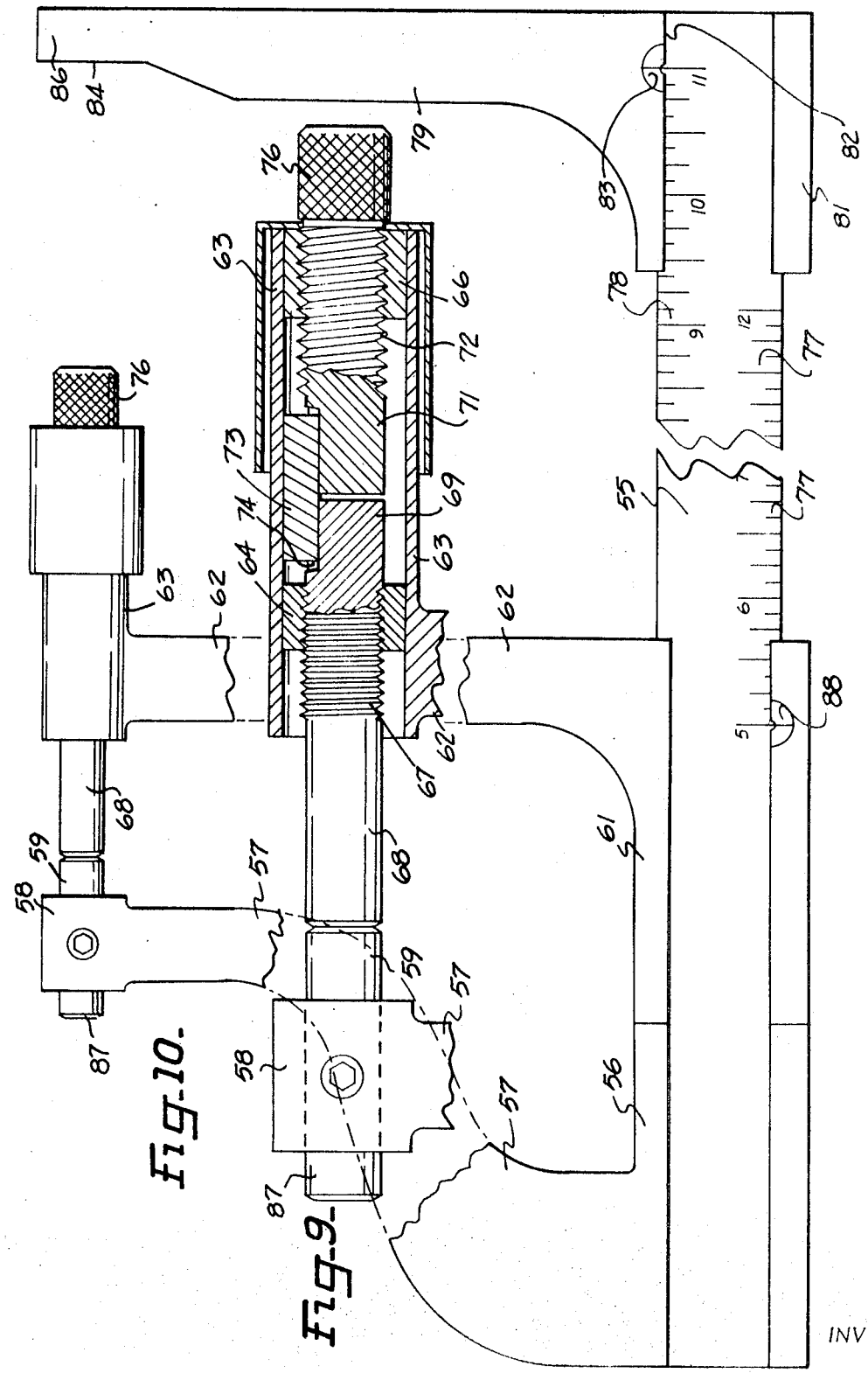

United States Patent Office 3,626,598
Patented Dec. 14, 1971

3,626,598
MICROMETER FOR DETERMINING SIZE OF CURING RIM
Elmer W. Robertson, P.O. Box 265,
Duncansville, Pa. 16635
Filed Mar. 23, 1970, Ser. No. 21,700
Int. Cl. G01b 5/00
U.S. Cl. 33—165
10 Claims

ABSTRACT OF THE DISCLOSURE

A properly fitted inside curing rim is vital in retreading tires, therefore it has to be accurately and quickly determined. To determine the size of the curing rim it is necessary to deduct the opposite thicknesses of the tire casing from the inside width of the matrix in which the retreading is to be performed. The micrometer herein, in the preferred form, has a double action adjustment whereby when the thickness of the tire casing is measured, the micrometer is adjusted for a double thickness, so that when the slide of the micrometer is placed to the correct matrix distance, a direct reading of the rim width can be taken on the scale.

BACKGROUND OF THE INVENTION

In the art of retreading, a properly fitted inside curing rim must be wide enough to fill the cross-sectional cavity width between the skirts of the retreading matrix less the thickness of the two tire sidewalls. The unknown sidewall thickness of the various sizes and types of tires to be retreaded, requires that a measuring instrument be used to determine accurately the proper rim width to fill the cross-section of the tire cavity.

An object of this invention is to take into account the thickness of both sidewalls of a tire casing and eliminate the necessity of measuring and adding a second tire sidewall thickness to the measurement of the first and also to eliminate the necessity of mentally subtracting the total or double sidewall thickness from the matrix cross-section in order to find the proper curing rim width.

Another object of the invention is to provide an instrument whereby a single measurement of the thickness of one sidewall of a tire casing, the micrometer is set so that upon opening it to a distance corresponding to the distance between the retreading matrix skirts, a direct reading of the correct rim width for the tire casing can be taken.

DESCRIPTION OF FIGURES

FIG. 1 is a partly sectional side view of a form of the double action micrometer for tire casings.

FIG. 2 is a cross-sectional view taken on lines 2—2 of FIG. 1.

FIG. 3 is a cross-sectional view taken on lines 3—3 of FIG. 1.

FIG. 6 is a fragmental side view of the micrometer wherein both abutments are adjusted.

FIG. 7 is a side view of the micrometer of FIG. 6 in measuring position on a wall of a tire casing.

FIG. 8 is a side view of the last mentioned micrometer with both abutments adjusted and the micrometer opened for contact with the opposite skirts of a retreading matrix.

FIG. 9 is a sectional fragmental view of a modified form of the double action micrometer.

FIG. 10 is a side view of the double action micrometer with a matrix width indicator on the rule.

DETAILED DESCRIPTION

Figure 4:
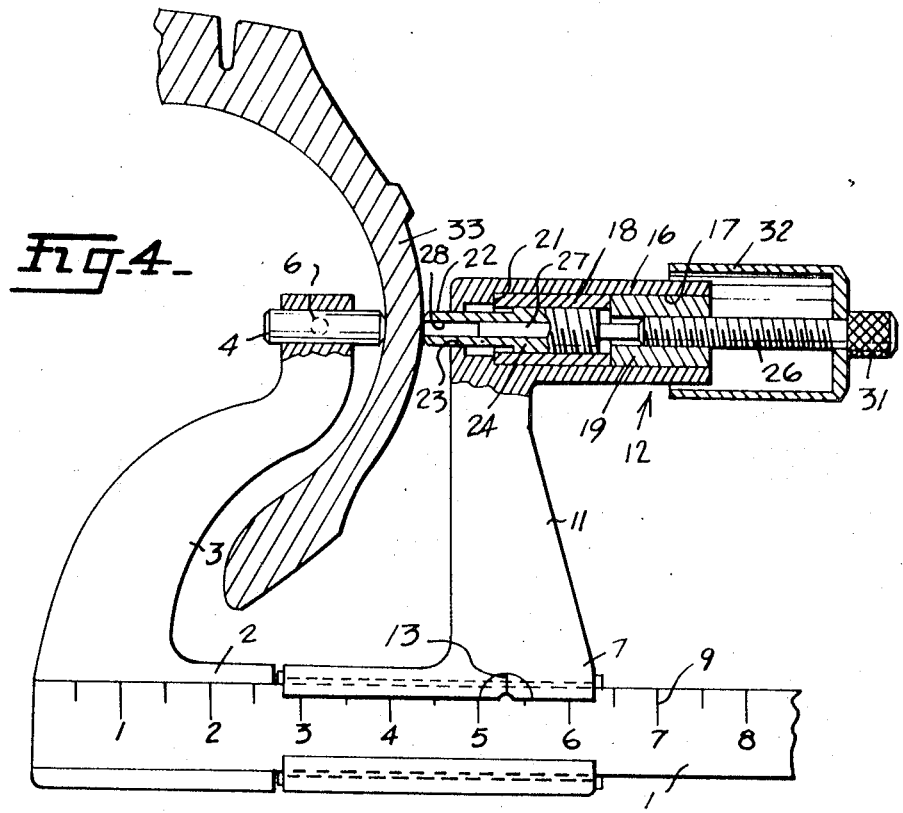
FIG. 4 is a cross-sectional view of the micrometer in measuring position on a sidewall of a tire casing.

Referring to FIGS. 1 to 5, a scale rule 1 is fixedly held in the base 2 of a bracket 3 in the top of which is an abutment dowel 4 held by a set screw 6 which forms the fixed end or side of the micrometer.

An adjustable or slideable base 7 has a pair of channels 8 formed therein to slideably fit over the scale rule 1. One side of the base 7 is longitudinally opened so as to permit the reading of the scale graduations 9 on the scale rule 1. A movable bracket 11 extends from the slideable base 7 and contains the adjustable micrometer device 12 to be hereinafter described. On the slideable base 7 there is a marker 13 alignable with the scale graduations 9 to indicate the desired rim width.

The micrometer is enclosed in a tubular head 16 on the top of the bracket 11 the cavity of which is in axial alignment with the abutment dowel 4. In the cavity 17 of the tubular head 16 are fixed a pair of internally threaded bushings 18 and 19.

The ratio between the threads in the inner bushing 18 and outer bushing 19 is two to one. For instance in the herein illustration the inner bushing 18 has sixteen threads per inch and the outer bushing 19 has eight threads per inch. The inner bushing 18 is nearer to the shoulder 21 in the end of the tubular head 16 opposite the dowel 4.

An abutment tip 22 is slideable through a reduced hole 23 in the inner end of the head 16. An enlarged driven stud 24 on the abutment tip 22 is threaded into the inner bushing 18. A driver stud 26 is threaded into the outer bushing 19. The driver stud 26 is suitably keyed or connected to the enlarged driven stud 24 for simultaneous rotation, for instance by a driver tip 27 slideably extended from the driver stud 26 into a keeper hole 28 in the driven stud 24 and in the abutment tip 22. In the illustration in FIGS. 1 to 5 the driver tip 27 and the keeper hole 28 are of rectangular cross section. On a reduced outer end 29 of the driver stud 26 is a suitable handle head 31 for manipulation. A shield 32 surrounds the tubular head 16 and the closed end is secured between the manipulating head 31 and the adjacent shoulder of the driver stud 26.

Figure 5:
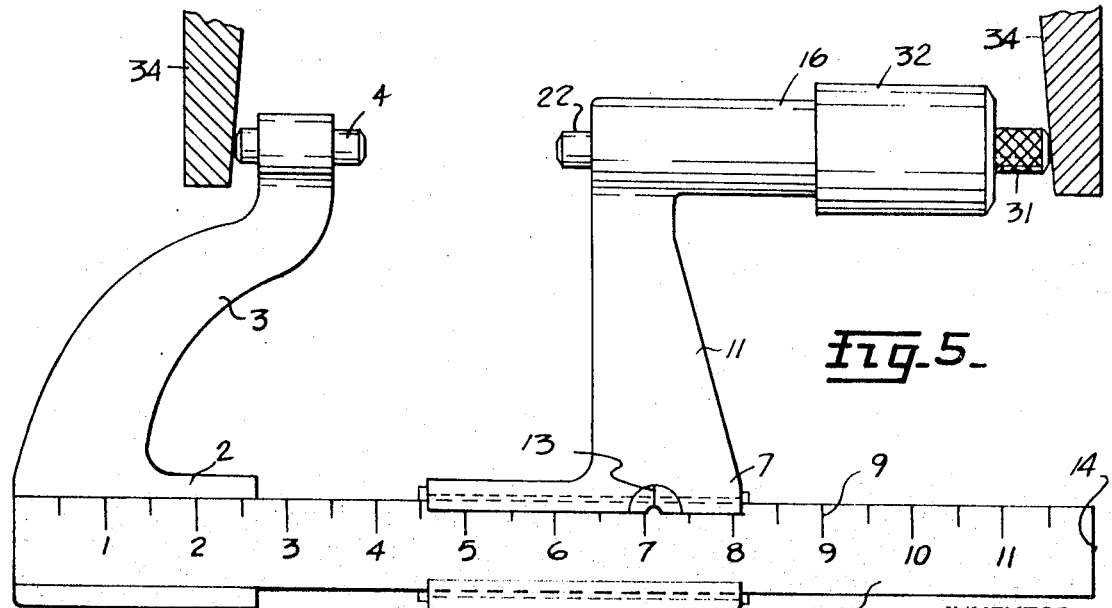
FIG. 5 is a side view of the micrometer opened to contact the opposite skirts of a retreading matrix.

In the operation of this form of the device the brackets 3 and 11 are in an initial position where the bases 2 and 7 are in contact on the scale rule 1. The driver stud 26 is turned in contraclockwise direction viewing FIGS. 1 and 3 so as to withdraw the abutment tip 27 away from the end of the dowel 4 to a sufficient distance to permit insertion over a side wall 33 of the tire casing, as shown in FIG. 4. Then while the dowel 4 is in contact with the inside surface of the side wall 33, the driver stud 26 is turned in clockwise direction viewing FIG. 4 until both the dowel 4 and the abutment tip 22 are in firm contact with the opposite faces of the tire side wall 33. Due to the two to one ratio of movement of the driver stud 26 relatively to the driven stud 24, the manipulating head 31 is moved away from the tubular head 16 twice the distance between the abutment tip 22 and the dowel 4, and correspondingly twice the thickness of the tire side wall 33. The inside rim width for the tire casing may be then determined by placing the micrometer between the matrix skirts 34 of the retreading matrix and by moving the base 7 of the bracket 11 along the scale graduations 9 until the dowel 4 and the handle head 31 abut the respective opposite matrix skirts 34 as shown in FIG. 5.

The marker 13 is initially so located relatively to graduations 9 as to indicate the spacing between the outer end of the dowel 4 and the outer end of the handle head 31. For instance in the initial position with the handle head 31, and the abutment tip 22 in their respective initial innermost positions, the spacing between the outer ends of the dowel 4 and the handle head 31 corresponds to the true spacing between the matrix skirts 34. But after the adjustment of the handle head 31 and the abutment tip 22 outwardly correspondingly to the thickness of the tire side wall 33, as shown in FIG. 4, the bracket 11 is set back from the handle head 31 toward the bracket 3 to a distance equal to twice the thickness of the tire wall 33, hence when the dowel 4 and the handle head 31 abut the opposite matrix skirts 34 the marker 13 will be opposite a graduation 9 indicating the spacing between the matrix skirts 34 less double the thickness of the tire side wall 33. Thus by making this automatic deduction the marker 13 indicates the correct spacing between the inside faces of the opposite tire side walls 33 and the correct corresponding inside rim width. The same result could be accomplished similarly to the operation illustrated in FIG. 10, by adjusting the matrix bracket 79 there shown on the scale rule 1 to the graduation 9 corresponding to actual known spacing between the matrix skirts of a selected matrix, and then moving the bracket 11 until the handle head 31 abuts the adjusted matrix bracket 79.

In the form shown in FIGS. 6 to 8 inclusive, the abutment dowel 41 is slideable in the top of the fixed bracket 42 and is held in an adjusted position by a set screw 43. The abutment tip 44 is slideable in the head 46 of the other bracket 47 and it has an enlarged head 48 on its inner end facing the abutment dowel 41. A coil spring 49 is provided between the bracket head 46 and the enlarged head 48 normally to urge the abutment tip 44 toward the abutment dowel 41. A set screw 51 fixes the abutment tip 44 in an adjusted position. In this form the set screw 51 is unscrewed and as the device is placed over the tire sidewall 33 and the bracket 42 is held to keep the dowel 41 in contact with the inside surface of the tire side wall 33, the bracket 47 is slid toward the bracket 42 until the base 7 contacts the base 2 in the initial position. This causes the abutment tip 44 to be pushed outwardly from the bracket 46 compressing the spring 49. In this position the set screw 51 is tightened so as to fix the abutment tip 44 in the proper or adjusted position. Both the abutment dowel 41 and the abutment tip 44 have corresponding graduations thereon, and after the measuring of the thickness of one of the tire sidewalls 33 as shown in FIG. 7, the other set screw 43 is unscrewed and the abutment dowel 41 is shifted outwardly to the same graduation as the graduation of the adjustment of the abutment tip 44. Thus when the brackets 42 and 47 are pulled apart to contact the matrix skirts 34, the necessary deduction of the thickness of two tire sidewalls 33 from the true distance between the matrix skirts 34 is made in the manner heretofore described, with the edge of base 7 in this instance indicating on the graduations 9 of the scale rule 1 the correct width of the inside curing rim.

In the form described in FIGS. 9 and 10 the scale rule 55 is secured at one end of a fixed bracket 56 of a fixed bracket 57 in the head 58 of which is secured the abutment dowel 59 by a set screw as in the first form heretofore described. A sliding base 61 of bracket 62 has on it a head 63 which is tubular and contains an abutment nut 64 and a driving nut 66 secured in fixed positions. An abutment stud 67 is in the abutment nut 64 and has an abutment tip 68 opposite the abutment dowel 59. The inner end 69 of the abutment stud 67 is connected to the inner end 71 of a driving stud 72 by a driving key 73 slideable in aligned slits 74 in the ends of the respective studs, so that the turning of the driving studs 72 will also turn the abutment stud 67. The outer end of the driving stud 72 is a handle head 76 for the manipulation of the driving stud 72 and also for abutment against the adjacent matrix skirt as hereinafter described. The ratio between the threads on the abutment stud 67 in the abutment nut 64 and the driving stud 72 in the driving nut 66 is two to one so that each counter-clockwise revolution of the driving stud 72 the driving stud will move out of the driving nut 66 twice as far, than the distance to which the abutment stud 67 is retracted into the abutment nut 64, thereby to project the handle head 76 to a distance equal twice the thickness of the tire sidewall 33 measured between the abutment dowel 59 and the abutment tip 68.

In this form there is one scale graduation 77 along the lower edge of the ruler 55 for indicating the rim width. Another scale graduation 78 along the top edge of the ruler 55 for indicating the known matrix width or known distance between the matrix skirts.

A matrix indicator bracket 79 has a base 81 slideable on the ruler 55 and having an opening 82 to expose the scale graduations 78. A matrix width marker 83 on the base 81 is in line with the abutment face 84 of the matrix skirt indicator 86 on the top of the matrix bracket 79. The matrix width indicator graduations 78 begin in registry with the outer end of the abutment dowel 59 so that the true matrix width is measured between the outer end 87 of the dowel 59 and the abutment face 84 of the matrix skirt indicator projection 86.

In operation when the matrix width is known the matrix indicator bracket 79 is moved to a position where the matrix width marker 83 registers with the graduation on scale graduations 78, corresponding to the known matrix width. After the tire sidewall thickness is measured as heretofore described the bracket 62 is moved on the ruler 55 until the handle head 76 abuts the abutment face 84. In this position the rim width marker 88 on the lower portion of the slideable bracket 62 indicates on the lower graduations 77 the correct inside rim width.

The devices herein described are simple to manipulate and determine the correct width of a properly fitted inside curing rim to fill the cross section of the cavity width between the matrix skirts minus the thickness of the two tire sidewalls, the devices eliminate the need for repeated measurements and mental calculations.

I claim:

1. In a device for determining the correct inside curing rim width to fill the space between opposite tire side walls to be held between the skirts of a matrix,
   a graduated frame element,
   a pair of abutment supports on said frame element,
   at least one of said abutment supports being adjustable relatively to the other abutment support along the graduations on said graduated frame element,
   abutment means supported on the respective supports and being movable therewith so as to be adapted to straddle a tire side wall for measuring the thickness of said tire side wall,
   adjacent inward portions on said abutment means being adapted to contact respectively the inner and outer surfaces of the tire side wall straddled by said abutment means,
   outward abutment portions on said abutment means adapted to contact respective matrix skirts,
   adjusting means to increase the distance between said outward abutment portions of said abutment means relatively to said supports by twice the thickness of one tire side wall contacted by said adjacent inward portions of said abutment means,
   an indicator on at least one of said supports coacting with said graduations to indicate on said graduations the distance between the outward abutment portions of said abutment means less twice the thickness of said tire side wall when said outward abutment portions of said abutment means are spaced apart to the distance between said matrix skirts.

2. The device of claim 1, and
   a matrix bracket adjustably held on said graduated frame element to indicate the known distance between the skirts of a selected matrix for said tire,
   the adjustable support with said indicator being movable along said graduations to abut the outer abutment portion to said matrix bracket for said indication of curing rim width.

3. The device of claim 1, and
   said adjusting abutment means including,
   a hollow head on the adjacent abutment support, a pair of spaced internally threaded members fixed in axial registry in said hollow head, said inward abutment portion of said adjustable abutment means being threadedly held in the threaded member nearer to the inward portion of the opposite abutment means, said outward portion of said abutment means being threadedly held in the other threaded member, means to relatively slideably connect said inward portion and outward portion for simultaneous turning in the respective threaded members, the ratio of the threads on said inward portion and its threaded member to the threads on said outward portion and its threaded member being two to one whereby the turning of said abutment portions of the adjustable abutment means results in axial movement of said outward abutment portion twice as long as the simultaneous axial movement of said inward abutment portion in the same direction.

4. The device of claim 1, and said abutment adjusting means including, a hollow head on the adjustable abutment support, two axially aligned threaded members formed in said hollow head, said inward abutment portion having a part threaded into the threaded member nearer to the other abutment means, said outward abutment portion having a part threaded into the other threaded member, means to relatively slideably connect said abutment portions of said adjustable abutment means for simultaneous turning movement, the relative ratio of threads in said threaded members being such s to result in axial movement of the outward abutment portion twice the distance of the axial movement of the inward abutment portion in the same direction relatively to said adjustable abutment support, said inward abutment portion being adapted to contact the surface of said tire side wall, said outward abutment portion being adapted to contact a matrix skirt.

5. The device of claim 1, and said graduated frame element being a ruler, said adjustable abutment support being adjustable along said ruler, the other abutment support being held fixed, the graduations on said ruler being measured from said fixed support, the abutment means on said fixed support being extended parallel with said ruler and the inward abutment portion thereof is adapted to contact the inner surface of said tire side wall, and the outward abutment portion thereof being adapted to contact a matrix skirt, the adjustable abutment means being extended on the adjustable abutment support parallel with the ruler, and the inward abutment portion thereof being adapted to contact the outer surface of said tire side wall, and the outward abutment portion thereof being adapted to contact a matrix skirt.

6. The device of claim 5, and a matrix bracket adjustable on said ruler to a graduation indicating the distance between the outward portion of said abutment means on said fixed support and the selected graduation corresponding to the distance between the matrix skirts of the selected matrix, an abutment face on said matrix bracket corresponding to a matrix skirt in registry with the outward portion of said adjustable abutment means, whereby after adjustment of said adjustable abutment means according to the width of the tire side wall and after moving said adjustable support toward said matrix bracket until the adjusted outward portion of the adjustable abutment means contacts said abutment face, the indicator on the adjustable support indicates on said graduations the distance between the matrix skirts less the thickness of two of the measured side walls.

7. The device of claim 6, wherein said outward portion of said adjustable adjusting means is a handle head having an abutment end.

8. The device of claim 6, wherein said relatively slideable connecting means between said inward portion and outward portion consists of an aligned key way and a key in the key way.

9. The device of claim 6, wherein said relatively slideable connection consists of a guide passage in one of said abutment portions of said adjustable abutment means, and a driving projection extended from the other abutment portion of said adjustable abutment means slideably and non-rotatably into said passage for transmitting rotation from one of said abutment portions to the other with freedom of relative sliding.

10. The device of claim 1, and the adjusting means on one of said abutment means being a graduated scale bar slideable into one of said supports parallel with said graduated frame, resiliently yieldable means to normally urge said scale bar toward the other abutment means, and to be compressed when pressed against a face of said tire side wall opposite the other abutment, releasable means to fix said scale bar in adjusted position wherein said resilient means are compressed, the other abutment means being another scale bar, and means to fix said other scale bar in position corresponding to said adjusted position of said first scale bar, the outer ends of said scale bars being adapted to abut the opposite matrix skirt of a selected matrix when said adjustable support is moved to a distance corresponding to the distance between said matrix skirt less twice the thickness of the measured tire side wall.

References Cited

UNITED STATES PATENTS

| | | | |
|---|---|---|---|
| 1,431,583 | 10/1922 | Johansson | 33—165 |
| 1,949,280 | 2/1934 | Lester | 33—165 |
| 2,394,328 | 2/1946 | O'Loughlin | 33—165 |

WILLIAM D. MARTIN, JR., Primary Examiner

U.S. Cl. X.R.

33—143 D, 164 B